United States Patent
Ognjanovski et al.

(10) Patent No.: US 8,430,140 B2
(45) Date of Patent: Apr. 30, 2013

(54) CAPLESS FUEL-FILLING CLOSURE ASSEMBLY

(75) Inventors: Robert G. Ognjanovski, Shelby Township, MI (US); David Ballheim, Dearborn, MI (US)

(73) Assignee: Ford Flobal Technologies, LLC, Dearborn, MI (US)

( * ) Notice: Subject to any disclaimer, the term of this patent is extended or adjusted under 35 U.S.C. 154(b) by 420 days.

(21) Appl. No.: 12/774,561

(22) Filed: May 5, 2010

(65) Prior Publication Data

US 2011/0132905 A1    Jun. 9, 2011

(51) Int. Cl.
   *B65B 1/04*    (2006.01)
(52) U.S. Cl.
   USPC ........ 141/350; 296/97.22; 220/86.2; 251/212
(58) Field of Classification Search .................. 141/349, 141/350; 296/97.22; 220/86.2; 251/212
   See application file for complete search history.

(56) References Cited

U.S. PATENT DOCUMENTS

| | | | |
|---|---|---|---|
| 4,384,457 A | 5/1983 | Harvey | |
| 4,598,741 A | 7/1986 | Johnson et al. | |
| 5,348,063 A | 9/1994 | Handleman | |
| 5,544,780 A | 8/1996 | Jye | |
| 6,375,155 B1 * | 4/2002 | Janssens | 251/212 |
| 7,819,728 B2 * | 10/2010 | Beckley | 454/155 |
| 7,967,041 B2 * | 6/2011 | Groom et al. | 141/367 |
| 2003/0098304 A1 | 5/2003 | Foltz | |
| 2009/0189410 A1 | 7/2009 | Gurtatowski et al. | |

* cited by examiner

*Primary Examiner* — Gregory Huson
*Assistant Examiner* — Jason K Niesz
(74) *Attorney, Agent, or Firm* — Julia Voutyras; Alleman Hall McCoy Russell & Tuttle LLP

(57) ABSTRACT

A capless fuel filling system for a vehicle including a closure assembly that forms an iris arrangement that is rotatable to form a seal for a fuel filling tube or provide access to the fuel filling tube.

20 Claims, 4 Drawing Sheets

CAPLESS FUEL-FILLING CLOSURE ASSEMBLY

BACKGROUND AND SUMMARY

A capless fuel filling system provides a closure for a fuel tank that simplifies refueling by eliminating a removable fuel cap. Specifically, the refueling process is simplified by eliminating the steps of removing the fuel cap prior to filling the fuel tank and then replacing the fuel cap after filling the fuel tank. Moreover, by eliminating the removable fuel cap, the inconvenience of keeping track of the fuel cap when it is removed from the fuel filling system can be eliminated.

One example of such a capless fuel filling system is illustrated by Foltz in US 2003/0098304 A1. Herein, a fuel filler neck, that provides access to a fuel tank, is sealed by a flapper door. The flapper door is pivotally mounted to an interior region of the fuel filler neck adjacent a nozzle-receiving aperture. A torsion spring biases the flapper door against a seating surface of the nozzle-receiving aperture to seal the fuel filler neck. The flapper door pivots open in a direction of insertion of a fuel nozzle to permit access to the fuel tank for refueling.

However, the inventors herein have recognized some potential issues with such a system. For example, since the flapper door pivots open in the direction of insertion of the fuel nozzle, the flapper door can be opened inadvertently by conditions other than insertion of a fuel nozzle, such as introduction of a foreign object, debris buildup, etc. As another example, since the flapper door seals the fuel filling neck via spring force, upon degradation of the torsion spring the seal can be compromised. As such, this capless fuel filler system is susceptible to environmental contamination of the fuel tank from dust, dirt, salt, water, snow, ice, and the like.

In one example, the above mentioned issues may be addressed by a closure assembly for a capless fuel filling system of a vehicle, comprising: a rotatable top closure ring; and a plurality of iris blades rotatably engaged with the top closure ring so as to be rotatable between a closed position with the plurality of iris blades collectively forming a seal for a fuel filling tube, and an open position allowing access to the fuel filling tube, depending on a top closure ring rotational position.

The iris arrangement of the closure assembly forms a robust seal that is less likely to become compromised because the plurality of iris blades is rotatably engaged with the rotatable top closure ring, and thus do not rotate open unless the rotatable top closure ring is rotated. Accordingly, even if a force is applied to the plurality of iris blades in the direction of insertion of the fuel nozzle, the closure assembly remains in the closed position with the seal intact. Further, the plurality of iris blades can be opened in a simple manner to allow access to a fuel nozzle for refueling by rotating the rotatable top closure ring. In this way, environmental contamination of fuel in the fuel tank may be inhibited while still allowing quick and easy refueling.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to a closure assembly for a capless fuel filling system of a vehicle that provides a fuel tank seal so as to inhibit environmental contamination while providing easy access for refueling. The closure assembly includes an iris arrangement that is actuatable between a closed position in which the fuel filling system is sealed and an open position to permit access to a fuel nozzle for refueling the fuel tank. The closure assembly of the present disclosure can be implemented as a component of a fuel system to provide a robust seal against environmental contamination and easy access for refueling. On the other hand, the closure assembly of the present disclosure can be retrofitted onto an existing capless fuel filling system to provide additional sealing capabilities. In particular, the closure assembly may be positioned upstream from a flapper door to protect the flapper door from environmental contamination. In either implementation, unlike previous capless closure designs in which a closure is integrated into a fuel filling tube, the closure assembly of the present disclosure can be externally mounted to a fuel filling tube so that the closure assembly can be easily replaced in case of degradation without having to replace the entire fuel filling tube.

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. Views of the illustrated embodiments are generally not drawn to scale; aspect ratios, feature size, and numbers of features may be purposely distorted to make selected features or relationships easier to see.

Figure 1:
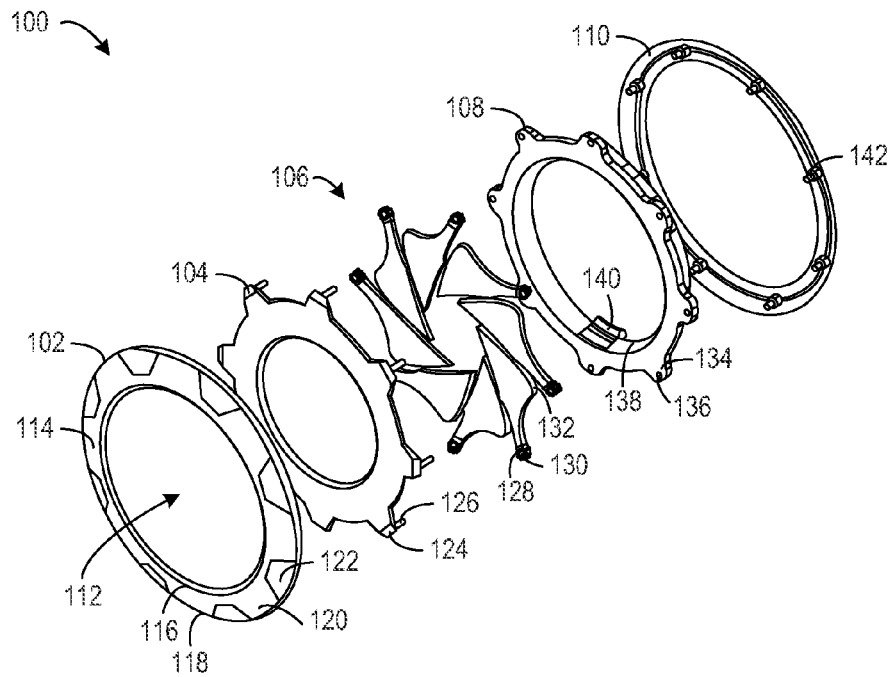
FIG. 1 is an exploded view of an embodiment of a fuel filling closure assembly of the present disclosure.

FIG. 1 shows an exploded view of an embodiment of a fuel filling closure assembly 100 (herein referred to as a "closure assembly") of the present disclosure. The closure assembly is sealable against fuel vapors in a fuel system of a vehicle even without a removable cap. The closure assembly 100 comprises a plurality of component layers that interact with one another to actuate between an open position and a closed position. In the open position, the component layers collectively form a central aperture 112 for receiving a fuel nozzle for refueling of a fuel tank (not shown). In the closed position, the component layers collectively seal off the central aperture 112 to inhibit environmental contamination of fuel in the fuel tank. More particularly, the closure assembly 100 comprises a top closure ring 102, a pivot ring 104, a plurality of iris blades 106, a fuel tube bezel 108, and a bottom closure ring 110.

The top closure ring 102 is the top or outermost component layer of the closure assembly 100. The top closure ring 102 comprises a top surface 114 that is defined by an outer radial edge 118 and an inner radial edge 116. The top surface 114 of the top closure ring 102 comprises a radial pattern of knobs 120 and depressions 122 that circumferentially alternate around the top surface of the top closure ring. Each of the knobs 120 extends between the inner radial edge 116 and the outer radial edge 118. Each of the knobs 120 becomes wider and taller moving from the outer radial edge 118 to the inner radial edge 116. Correspondingly, each of the depressions 122 extends between the outer radial edge 118 to just before the inner radial edge 116 so that each of the depressions spans a substantial portion of the top surface 114 between the inner radial edge 116 and the outer radial edge 118. Each of the depressions 122 becomes narrower and deeper moving from the outer radial edge 118 towards the inner radial edge 116 to inversely correspond with each of the knobs 120. The radial pattern of knobs 120 and depressions 122 formed on the top surface 114 of the top closure ring 102 act as finger holds so that the top closure ring can be easily gripped for rotation to open/close the closure assembly 100.

The pivot ring 104 is positioned below the top closure ring 102 in the closure assembly 100. The pivot ring 104 forms an inner circle that is smaller than an inner circle formed by top closure ring 102, as well as inner circles formed by the other component layers of the closure assembly 100. Accordingly, when the closure assembly 100 is opened for refueling, a size of the central aperture 112 is defined by the inner circle formed by the pivot ring 104. The pivot ring 104 comprises a plurality of radial spokes 124 that extend from the pivot ring. The radial spokes 124 are sized such that a circle collectively formed from outer edges of the radial spokes is smaller than a circle formed by the outer edge of the top closure ring 102. Accordingly, when the closure assembly 100 is assembled the radial spokes 124 of the pivot ring 104 are contained within the top closure ring 102.

Each of the radial spokes 124 includes a corresponding post 126 that extends from a bottom surface of the pivot ring 104 perpendicularly in a direction opposite from the top closure ring 102. The posts 126 are positioned to pass through central passages formed in each of the iris blades to engage the plurality of iris blades 106 below the pivot ring 104 in the closure assembly 100. In particular, each of the posts 126 acts as an anchor and a pivot point for each of the iris blades 106. In other words, the iris blades 106 are pivotably secured by the post 126 in an iris arrangement. In the illustrated embodiment, the iris arrangement includes eight iris blades. Note any suitable number of iris blades may be employed to form the iris arrangement. For example, an iris arrangement may employ four iris blades, six iris blades, etc.

The plurality of iris blades 106 each includes a sprocket 128 that forms a central passage 130 to receive the corresponding post 126. When each of the iris blades is secured by the corresponding posts 126, the sprocket 128 engages with gear teeth 148 (shown in FIG. 3) located on a bottom surface of the top closure ring 102 such that rotation of the top closure ring causes rotation of each of the sprockets so that the iris blades 106 pivot about the posts 126. In some embodiments, the sprocket, teeth on the sprocket, and/or the gear teeth on the top closure ring may be shaped and/or sized differently to provide different and/or more robust operation. For example, the components may be shaped and/or sized differently to provide more or less rotation to cause the plurality of iris blades to actuate between the open and closed positions.

The plurality of iris blades are rotatable between a closed position in which the plurality of iris blades collectively form a seal for a fuel filling tube to protect against environmental contamination (e.g., dust, dirt, salt, water, snow, ice, etc.) and an open position to allow access to the fuel filling tube based on rotation of the top closure ring. Each of the iris blades 106 includes a beveled edge 132 on a right side and a left side of the iris blade. The beveled edge 132 facilitates interlacing of adjacent iris blades when the iris blades are rotated to a closed position. The fuel tube bezel 108 is positioned below the plurality of iris blades 106 in the closure assembly 100. The fuel tube bezel 108 includes a plurality of spokes 134 that each form a hole 136. The number of spokes 134 on the fuel tube bezel 108 corresponds with the number of spokes 124 on the pivot ring 104. The holes 136 are positioned in the spokes 134 to receive the posts 126 once they have passed through the central passage 130 of the iris blades 106 so as to pivotably secure the iris blades between the pivot ring and the fuel tube bezel.

The fuel tube bezel 108 includes a cylinder 138 that extends into the central aperture 112 down through the bottom closure ring 110 when the closure assembly is assembled. The cylinder 138 provides an interface to mount the closure assembly 100 to a fuel filling tube to provide an external seal against environmental contamination. In particular, the fuel tube bezel 108 can fit over a fuel filling tube without deforming so as to protect the iris arrangement from deformation in order to preserve the seal. The fuel tube bezel 108 includes a latch 140 positioned along a bottom edge of cylinder 138. The latch 140 cooperates with features of the fuel filling tube to snap-fit the closure assembly to the fuel filling tube. The snap-fit coupling allows for quick and easy installation of the closure assembly to a fuel filling tube. Moreover, the snap-fit coupling allows for quick and easy removal in case of replacement. In some embodiments, the fuel tube bezel may include a gasket or other seal positioned around or incorporated into the cylinder to provide a seal between the fuel tube bezel and the fuel filling tube. In some embodiments, the cylinder can be sized to fit inside the fuel filling tube to create a seal. In some embodiments, the cylinder can be sized to fit over the top and outside of the fuel filling tube to create a seal. It will be appreciated that any suitable coupling configuration may be employed to mount the closure assembly to a fuel filling tube.

The bottom closure ring 110 is positioned below the fuel tube bezel 108 in the closure assembly 100. The bottom closure ring 110 couples to the top closure ring 102 to circumferentially enclose the pivot ring 104, the iris blades 106 and the fuel tube bezel 108 in the closure assembly 100. In particular, the bottom closure ring 110 includes a plurality of snap-posts 142 that are arranged on a top surface of the bottom closure ring. The snap-posts 142 snap fit into receiving barrels 146 (shown in FIG. 2) that are located on the bottom surface of the top closure ring 102 positioned substantially under the depressions 122. The snap-posts 142 and the receiving barrels 146 are arranged on the bottom closure ring and the top closure ring, respectively to be rotationally offset from the spokes of the pivot ring and the fuel tube bezel so that the posts can be inserted in the receiving barrels without interference from the intermediate component layers.

Note an upper portion of the fuel tube bezel 108 including the spokes 134 is contained in the enclosure formed by the top closure ring 102 and the bottom closure ring 110, and a bottom portion of the fuel tube bezel including the cylinder 138 extends into the central aperture 112 and down through an inner circle formed by the bottom closure ring so that the fuel tube bezel can interface with a fuel filling tube to mount the closure assembly 100.

It will be appreciated that the component layers of the closure assembly may be formed from any suitable materials. For example, the component layers may be at least partially formed from rigid plastic or metal. In some embodiments, the iris blades may be at least partially formed from at least a semi-rigid material that can create a seal via interlaced iris blades without deformation due to insertion of a fuel nozzle or a foreign object.

Figure 2:
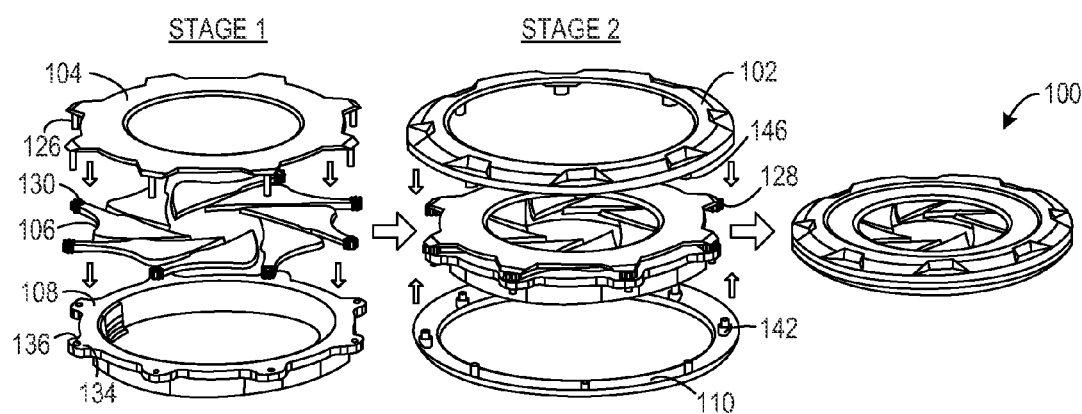
FIG. 2 illustrates a process for assembling the fuel filling closure assembly of FIG. 1.

FIG. 2 shows a process for assembling the closure assembly 100. The assembly process is two stages that are illustrated from left to right. In the first stage of the assembly process, the iris arrangement is assembled, that is, the plurality of iris blades 106 are rotatably secured between the pivot ring 104 and the fuel tube bezel 108. In particular, the central passage 130 of each of the iris blades 106 is aligned with a corresponding post 126 of the pivot ring 104. Once aligned, each iris blade is slid onto the corresponding post. The iris blades can be arranged so that the iris arrangement is placed in a closed position to check for suitable interlacing of the iris blades so that a suitable seal is created when the iris arrangement is closed.

Next, the pivot ring 104 is aligned with the fuel tube bezel 108 so that each of the posts 126 is aligned with each of the holes 136. Once aligned, the posts 126 are slid into the holes 136 to sandwich the iris blades 106 between the pivot ring 104 and the fuel tube bezel 108. To secure the pivot ring 104 to the fuel tube bezel 108, the posts 126 can be heat staked, mashed down upon a bottom surface of the spokes 134, or secured in another suitable fashion to fix the posts 126 in the holes 136. Each of the posts 126 secured between the pivot ring 104 and the fuel tube bezel 108 act as a pivot axis for each of the iris blades 106, effectively locking the iris blades between the pivot ring and the fuel tube bezel while allowing the blades to freely pivot around the posts.

In the second stage of the assembly process, the iris arrangement is enclosed in the closure ring (the top closure ring 102 and the bottom closure ring 110) to conceal the pivoting components. The top closure ring 102 is positioned relative to the iris arrangement so that the gear teeth 148 (shown in FIG. 3) positioned on the bottom surface of the top closure ring align with the sprockets 128 of the iris blades 106. In particular, the sprockets should be centered in the corresponding gear teeth so that there is enough rotational clearance for the iris to open completely. Once the top closure ring 102 is aligned with the iris arrangement, the snap-posts 142 of the bottom closure ring 110 are aligned with the receiving barrels 146 of the top closure ring. The top closure ring 102 is secured to the bottom closure ring 110 by pressing the snap-posts 142 into the receiving barrels 146. In some embodiments, a suitable adhesive can be administered to the receiving barrels in order to retain the posts so that the closure ring does not separate after assembly. Once the closure assembly is assembled it can then be locked down upon a fuel filling tube via the latch of the fuel tube bezel or another suitable mounting feature.

Figure 3:
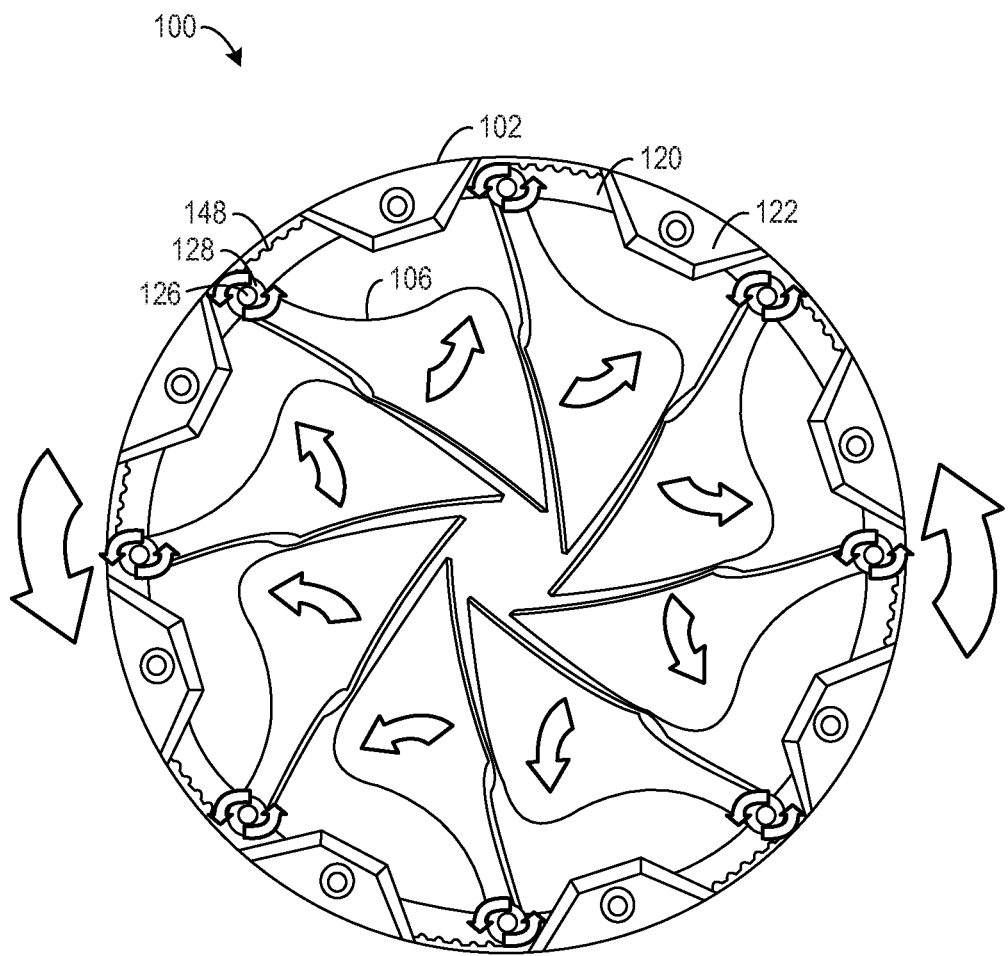
FIG. 3 illustrates actuation of an iris arrangement to open/close the fuel filling closure assembly of FIG. 1.

FIG. 3 shows an underside view of the top closure ring and the iris arrangement. The plurality of iris blades 106 that collectively form the iris arrangement each interact with a section of gear teeth 148 located on the bottom surface of the top closure ring 102 to open/close the closure assembly 100 based on rotation of the top closure ring. The sections of the gear teeth 148 are positioned along an outer edge of the underside of the knobs 120 of the top closure ring 102. The sections of the gear teeth 148 are positioned intermittently along the circumference of the top closure ring 102 and are separated by the depressions 122 of the top closure ring. When rotating the top closure ring 102, the gear teeth 148 rotatably engage the sprocket 128 of each of the iris blades 106 and cause it to rotate on the post 126 of the pivot ring. As discussed above, during assembly each of the iris blades 106 are positioned approximately in the center of each section of the gear teeth 148 so that there is enough clearance for the sprockets 128 of the iris blades 106 to rotate before reaching the depressions so that the closure assembly can fully actuate between a closed position and an open position.

In the illustrated example, clockwise rotation of the top closure ring as viewed from the outer surface of the closure assembly (or from outside the vehicle) rotates the iris blades to an open position, and counter-clockwise rotation of the top closure ring rotates the iris blades to a closed position. Likewise, the plurality of iris blades rotates in the same sense of direction as rotation of the top closure ring (e.g. clockwise to open, counter-clockwise to close). It will be appreciated that the closure assembly can be modified so that counter-clockwise rotation opens the closure assembly and clockwise rotation closes the closure assembly. Also, the closure assembly can be modified so that the iris blades rotate differently to the rotational position of the top closure ring.

Furthermore, all of the iris blades rotate in the same plane which is substantially perpendicular to the direction of insertion of a fuel nozzle through the central aperture of the closure assembly and into the fuel filling tube. Since the direction of rotation of the iris blades is different from the direction of insertion of the fuel nozzle, the seal formed by the iris blades is less likely to be compromised by environmental conditions that apply force to the iris blades. In this way, the seal is made more robust while still providing easy assess to a fuel nozzle for refueling.

FIGS. 4A-4E show a sequence of the closure assembly 100 actuating from a closed position to an open position. Moving from left to right on the page, each step of the sequence is shown from a top-side view of the closure assembly, a bottom-side view of the closure assembly, and a close-up view of the sprocket interacting with the gear teeth. The plurality of iris blades that make up the iris arrangement of the closure assembly are rotatably engaged with the top closure ring so as to be rotatable from the closed position to the open position depending on a top closure ring rotational position. In the illustrated embodiment, the gear ratio of the sprocket of each iris blade to the gear teeth on the top closure ring causes the closure assembly to move from the closed position to the open position based on a 5 degree rotation of the top closure ring.

Figure 4:
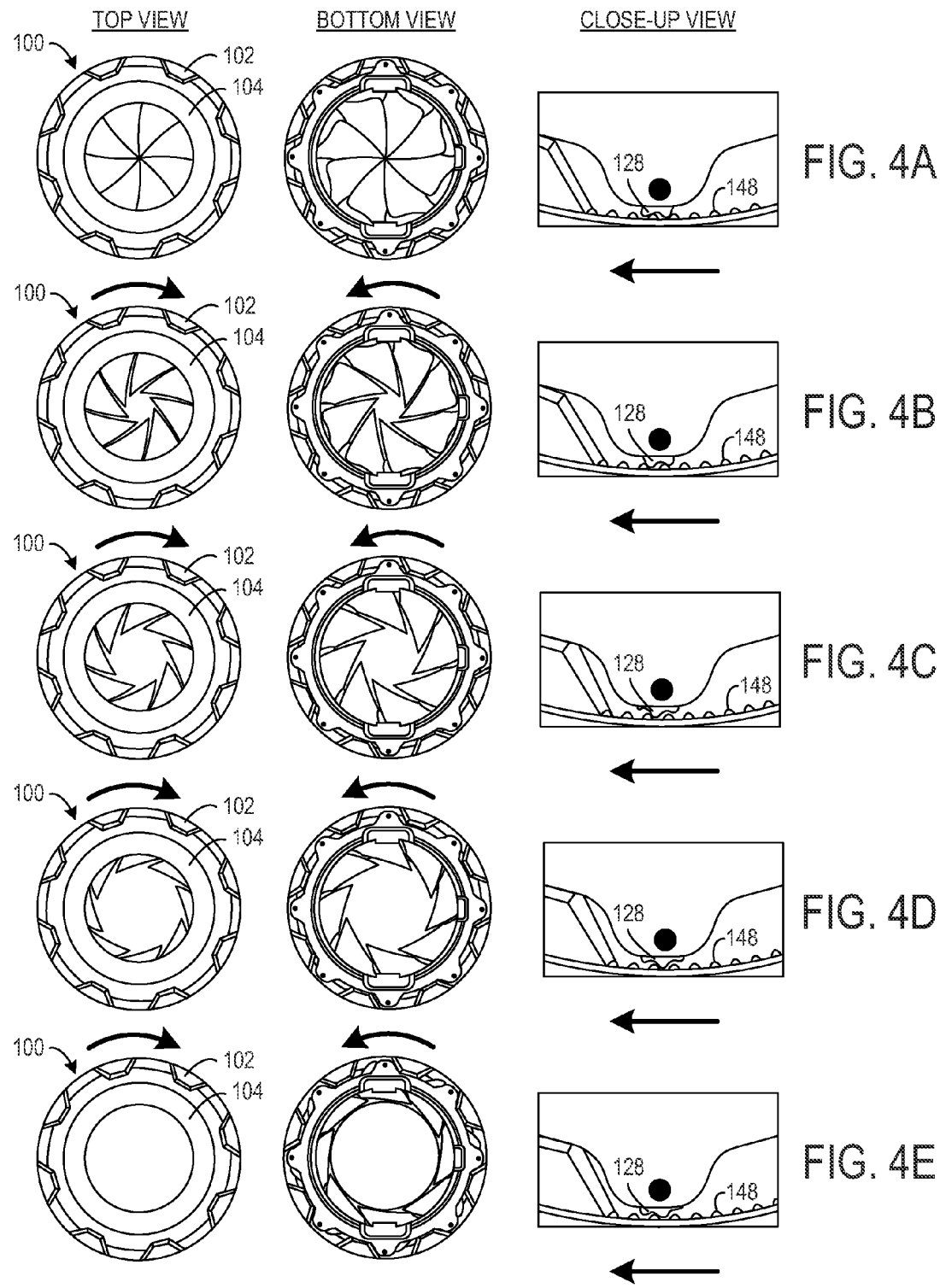
FIGS. 4A-4E incrementally show an opening process of the fuel filling closure assembly.

FIG. 4A shows the closure assembly 100 in a fully closed position. The iris blades are interlaced with one another to collectively form a seal to inhibit environmental contamination. The sprocket 128 is centrally positioned in the section of gear teeth 148.

FIG. 4B shows the top closure ring 102 rotated 1.25 degrees clockwise causing the sprocket 128 to rotate to the left resulting in a 8.75 degree rotation of the iris blades from the closed position. The iris arrangement is ¼ of the way open.

FIG. 4C shows the top closure ring 102 rotated 2.5 degrees clockwise causing the sprocket 128 to rotate to the left resulting in a 17.5 degree rotation of the iris blades from the closed position. The iris arrangement is ½ of the way open. As the iris blades rotate open, each of the iris blades fall into one another aided by the beveled edges on each of the iris blades.

FIG. 4D shows the top closure ring 102 rotated 3.75 degrees clockwise causing the sprocket 128 to rotate to the left resulting in a 26.25 degree rotation of the iris blades from the closed position. The iris arrangement is ¾ of the way open.

FIG. 4E shows the top closure ring 102 rotated 5 degrees clockwise causing the sprocket 128 to rotate to the left resulting in a 35 degree rotation of the iris blades from the closed position. The iris blade 106 is fully rotated when the sprocket 128 is substantially at the edge of the section of the gear teeth 148. In the open position, each iris blade is nested with one another and concealed from view external to the closure assembly (or outside the vehicle) by the pivot ring 104. In other words, in the open position the pivot ring 104 covers the plurality of iris blades 106. When the closure assembly 100 is in the open position, the central aperture 112 is approximately 43 millimeters.

Note the beveled edges modeled into each of the iris blades help guide the blades back into their fully closed position as well as completely block off the Fuel Fill Tube opening when the top closure ring is rotated in the counter-clockwise position.

It will be appreciated that the above described configuration is exemplary and that it can be modified to accommodate different degrees of rotation of the top closure ring and/or iris blades to open/close the closure assembly without departing from the scope of the present disclosure. Further, the size and/or shape of the central aperture can be modified to accommodate different applications.

Figure 5:
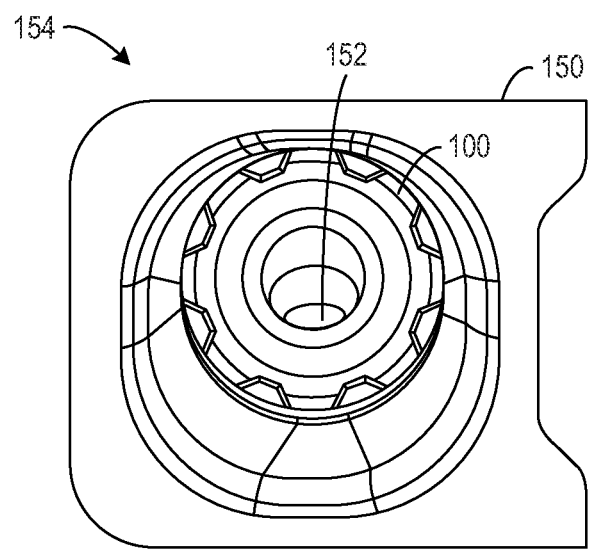
FIG. 5 shows the fuel filling closure assembly of FIG. 1 installed in a fuel filling tube housing.

FIG. 5 shows the closure assembly 100 installed in a fuel filling tube housing 150 as part of a capless fuel system 154. The closure assembly 100 is shown in the open position, which exposes an opening of a fuel filling tube 152. The closure assembly 100 is recessed in the fuel filling tube housing 150 so as to inhibit environmental contaminants from entering the fuel filling tube 152 when the closure assembly 100 is open during refueling. The closure assembly 100 provides an outer seal for the fuel filling tube 152 and does not interfere with a fuel nozzle that is placed in the fuel filling tube during refueling because the iris blades of the closure assembly rotate out of the central aperture and are nested in the surrounding enclosure when the closure assembly is placed in the open position.

Figure 6:
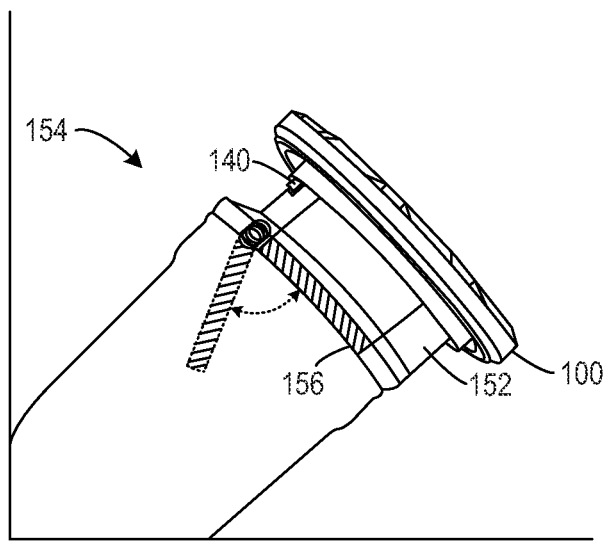
FIG. 6 shows a fuel filling system including the fuel filling closure assembly of FIG. 1.

FIG. 6 shows the closure assembly 100 mounted on the fuel filling tube 152 as part of the capless fuel system 154. The capless fuel system 154 includes a flapper door 156 that is positioned in the fuel filling tube 152. The flapper door 156 is spring-biased closed and can be opened via insertion of a fuel nozzle during refueling. As discussed above, the seal created by the flapper door can be compromised in a variety of ways which can result in environmental contamination. With the closure assembly 100 fixed in place on the outer edge of the fuel filling tube 152, the flapper door and/or the fuel filling tube can be shielded from dust, dirt, debris, or other environmental contaminants. In other words, the closure assembly aids in preventing the flapper door from being compromised.

The closure assembly 100 fits over an outer edge of the fuel filling tube 152 to create an external seal to inhibit environmental contamination of fuel in the fuel system 154. The closure assembly 100 mounts to the fuel filling tube 152 via latch 140 that is positioned on a cylinder of the fuel tube bezel to provide an interface that interacts with external features of the fuel filling tube to snap-fit the closure assembly in place over the fuel filling tube. The snap-fit operation of latch 140 allows for simple installation or mounting of the closure assembly 100. As such, the closure assembly 100 can be easily retrofitted to a late model capless fuel system in order to provide more robust sealing capabilities against environmental contamination. Moreover, the snap-fit operation of the latch 140 allows for simple removal of the closure assembly 100 for replacement without necessitating removal of the entire fuel filling tube as is the case in some other fuel filling configurations.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A vehicle closure assembly, comprising:
    a capless fuel filling system, including:
        a rotatable top closure ring; and
        a plurality of iris blades rotatably engaged with the top closure ring so as to be rotatable between a fully closed position with the plurality of iris blades fully interlaced and collectively forming a seal for a fuel filling tube, and an open position allowing access to the fuel filling tube, depending on a top closure ring rotational position.

2. The assembly of claim 1, wherein the closure assembly further comprises:
    a pivot ring comprising a plurality of posts that correspond to the plurality of iris blades;
    each iris blade of the plurality of iris blades forming a passage to receive a corresponding post of the plurality of posts; and
    a fuel tube bezel forming a plurality of holes to receive the plurality of posts to pivotably secure each iris blade of the plurality of iris blades between the pivot ring and the fuel tube bezel on the corresponding post of the plurality of posts.

3. The assembly of claim 2, wherein the plurality of iris blades is covered by the pivot ring to conceal the plurality of iris blades from view from outside the vehicle when the plurality of iris blades is in the open position.

4. The assembly of claim 2, wherein the closure assembly further comprises:
    a bottom closure ring coupled to the rotatable top closure ring to circumferentially enclose the pivot ring, the plurality of iris blades, and the fuel tube bezel.

5. The assembly of claim 4, wherein the fuel tube bezel comprises a cylinder for interfacing with the fuel filling tube that extends through a central aperture formed by the bottom closure ring, the cylinder comprising a latch for securing the closure assembly to the fuel filling tube.

6. The assembly of claim 1, further comprising:
    a flapper door forming a seal in the fuel filling tube downstream of the closure assembly.

7. The assembly of claim 1, wherein the rotatable top closure ring comprises a top surface that forms a radial pattern of alternating knobs and depressions.

8. The assembly of claim 1, wherein each iris blade of the plurality of iris blades comprises a sprocket; and
    the rotatable top closure ring comprising a bottom surface that forms a plurality of gear teeth that engage the sprocket of each iris blade of the plurality of iris blades to rotate the plurality of iris blades based on rotation of the top closure ring.

9. The assembly of claim 1, wherein each iris blade of the plurality of iris blades comprises a beveled edge that interlaces with adjacent iris blades when the plurality of iris blades is in the closed position.

10. The assembly of claim 1, wherein each iris blade of the plurality of iris blades rotates in the same sense of rotation as the top closure ring, and each iris blade of the plurality of iris blades rotates in a direction that is different than a direction of insertion of a fuel nozzle into the fuel filling tube.

11. A closure assembly for a capless fuel filling system of a vehicle, comprising:
   a top closure ring;
   a pivot ring positioned below the top closure ring, the pivot ring comprising a plurality of posts;
   a plurality of iris blades engaged with the top closure ring, each iris blade of the plurality of iris blades forming a passage for receiving a corresponding post of the plurality of posts;
   a fuel tube bezel forming a plurality of holes for receiving the plurality of posts such that the plurality of iris blades are positioned between the pivot ring and the fuel tube bezel; and
   a bottom closure ring coupled to the top closure ring to circumferentially enclose the pivot ring, the plurality of iris blades, and the fuel tube bezel.

12. The system of claim 11, wherein the plurality of iris blades are rotatable between a closed position with the plurality of iris blades collectively forming a seal for a fuel filling tube, and an open position allowing access to the fuel filling tube, depending on a top closure ring rotational position.

13. The system of claim 12, wherein each iris blade of the plurality of iris blades comprises a sprocket; and
   the top closure ring comprises a bottom surface that forms a plurality of gear teeth that engage the sprocket of each iris blade of the plurality of iris blades to rotate the plurality of iris blades based on rotation of the top closure ring.

14. The system of claim 13, wherein each iris blade of the plurality of iris blades rotates in a direction that is different than a direction of insertion of a fuel nozzle into the fuel filling tube.

15. The system of claim 13, wherein each iris blade of the plurality of iris blades rotates in the same sense of rotation as the top closure ring.

16. The system of claim 15, wherein each iris blade of the plurality of iris blades comprises a beveled edge that interlaces with adjacent iris blades when the plurality of iris blades is in the closed position.

17. The system of claim 11, wherein the fuel tube bezel comprises a cylinder that extends through a central aperture formed by the bottom closure ring, and the cylinder comprises a latch for mounting the closure assembly to a fuel filling tube.

18. A capless fuel filling system for a vehicle comprising:
   a fuel filling tube;
   a spring-biased flapper door; and
   a closure assembly positioned upstream of the spring-biased flapper door, the closure assembly comprising:
      a rotatable top closure ring comprising a bottom surface forming a plurality of gear teeth;
      a pivot ring positioned below the rotatable top closure ring, the pivot ring comprising a plurality of posts;
      a plurality of iris blades, each iris blade of the plurality of iris blades comprising a sprocket rotatably engaged with corresponding gear teeth of the plurality of gear teeth so that the plurality of iris blades rotate between a closed position with the plurality of iris blades collectively forming a seal for the fuel filling tube and an open position to allow access to the fuel filling tube depending on a rotatable top closure ring rotational position, and the sprocket forming a passage for receiving a corresponding post of the plurality of posts;
      a fuel tube bezel forming a plurality of holes for receiving the plurality of posts such that the plurality of iris blades are positioned between the pivot ring and the fuel tube bezel; and
      a bottom closure ring coupled to the top closure ring to circumferentially enclose the pivot ring, the plurality of iris blades, and the fuel tube bezel.

19. The system of claim 18, wherein each iris blade of the plurality of iris blades comprises a beveled edge that interlaces with adjacent iris blades when the plurality of iris blades is in the closed position.

20. The system of claim 18, wherein each iris blade of the plurality of iris blades rotates in the same sense of rotation as the rotatable top closure ring, wherein each iris blade of the plurality of iris blades rotates in a direction that is different than a direction of insertion of a fuel nozzle into the fuel filling tube, and wherein the system is sealable against fuel vapors even without a removable cap.

* * * * *